United States Patent
Yao

(10) Patent No.: US 7,632,885 B2
(45) Date of Patent: Dec. 15, 2009

(54) RESIN COMPOSITION, RESIN MOLDING, PACKAGE AND PRODUCTION METHOD OF RESIN MOLDING

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 267 days.

(21) Appl. No.: 11/715,366

(22) Filed: Mar. 8, 2007

(65) Prior Publication Data

US 2008/0051501 A1 Feb. 28, 2008

(30) Foreign Application Priority Data

Aug. 23, 2006 (JP) ............................. 2006-226840

(51) Int. Cl.
*C08K 3/22* (2006.01)
*C08L 67/04* (2006.01)

(52) U.S. Cl. ....................................... 524/436; 525/419
(58) Field of Classification Search ................... 524/436
See application file for complete search history.

(56) References Cited

U.S. PATENT DOCUMENTS 7,268,190 B2 * 9/2007 Ohme et al. ................. 525/400
2005/0154148 A1 * 7/2005 Nakamichi et al. .......... 525/450
2006/0276582 A1 * 12/2006 Mochizuki et al. .......... 524/537

FOREIGN PATENT DOCUMENTS

JP          A 2005-048067         2/2005

* cited by examiner

*Primary Examiner*—Peter Szekely
(74) *Attorney, Agent, or Firm*—Oliff & Berridge, PLC

(57) ABSTRACT

A resin composition includes: a plant-derived polymer compound; and a polyimide resin.

17 Claims, 1 Drawing Sheet

RESIN COMPOSITION, RESIN MOLDING, PACKAGE AND PRODUCTION METHOD OF RESIN MOLDING

CROSS-REFERENCE TO RELATED APPLICATIONS

This application is based on and claims priority under 35 USC 119 from Japanese Patent Application No. 2006-226840 filed Aug. 23, 2006.

BACKGROUND

1. Technical Field

The present invention relates to a resin composition, a resin molding, a package and a production method of a resin molding.

2. Related Art

Recently, from efforts to environmental problems represented by global warming, exhaustion of petroleum and waste issue, and concept of establishment of sustained circulating society, development of a biomass material derived from plants (plant-derived polymer compound) is increasingly made. For example, a polylactic acid is noted as a biomass material that is produced from grains without using petroleum at all, and is used to applications such as agricultural sheets and household garbage bags.

However, a biomass material such as a polylactic acid has the problems that it is hard and brittle, and has poor heat resistance, and as a result, its application is limited to very narrow range. To improve those problems, a resin composition comprising a blend of a petroleum resin material having plasticity and heat resistance and a biomass material is proposed, and such a resin composition is attempted to use in packages of a portable music player, a laptop computer and the like.

On the other hand, attempts are made that its brittleness is improved by crystallizing a biomass material such as a polylactic acid using a method of increasing a mold temperature during molding to high temperature, a method of molding a film and then biaxially stretching the film, or the like, and such a resin composition is used in, for example, meal trays, and package films for DVD, CD-ROM or the like. In this case, a biobased content of a material is nearly 100%.

SUMMARY

According to an aspect of the invention, there is provided a resin composition, which includes: a plant-derived polymer compound; and a polyimide resin.

BRIEF DESCRIPTION OF THE DRAWING

Exemplary embodiment of the present invention will be described in detail based on the following figure, wherein.

DETAILED DESCRIPTION

Figure 1:
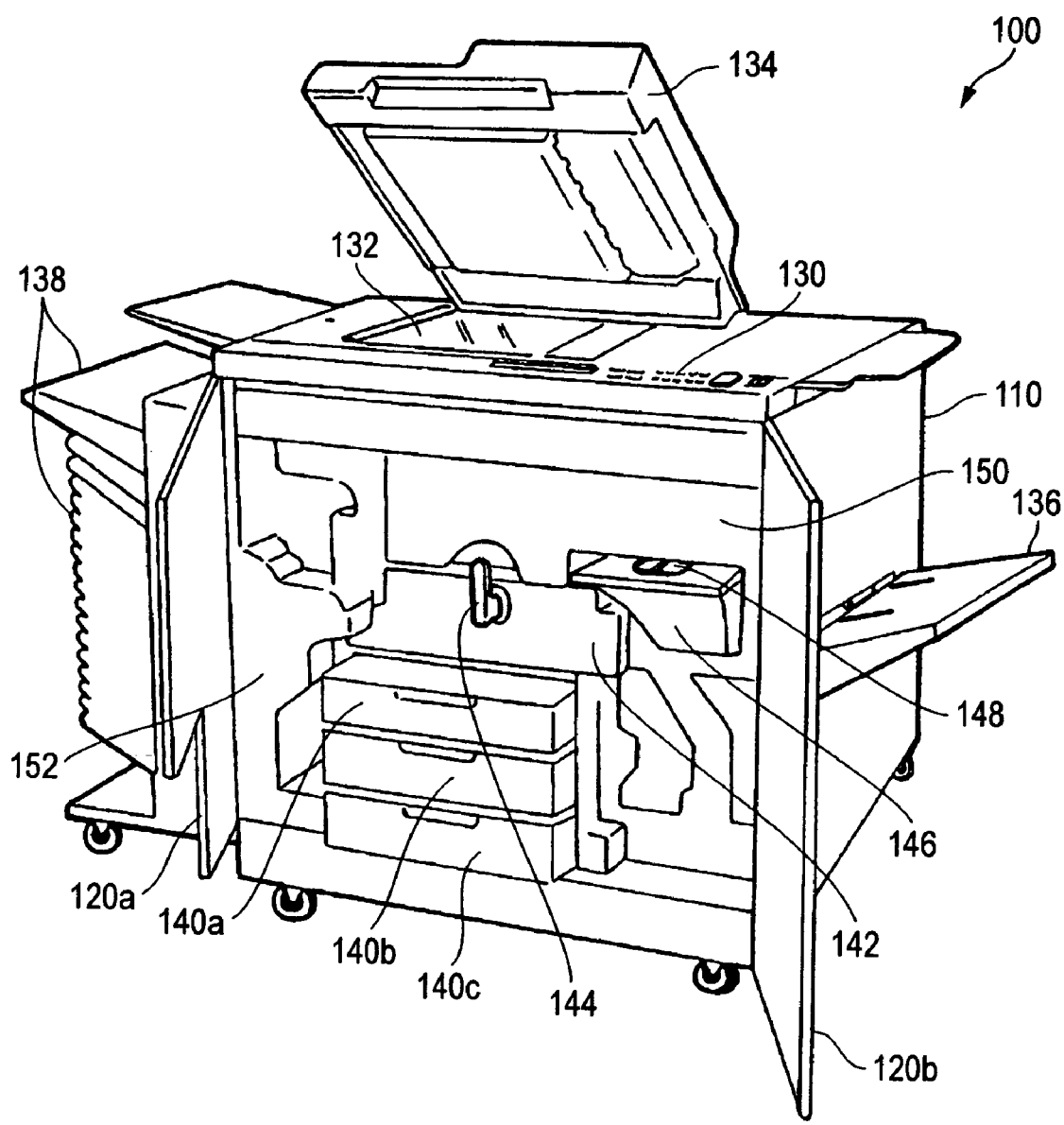
FIG. 1 is an appearance perspective view showing an image forming apparatus provided with packages and business equipment parts, according to one exemplary embodiment of the resin molding of the invention.

A preferable embodiment of the present invention is described in detail below by referring to the drawing if necessary. In the drawing, the same part or the corresponding part is assigned to the same reference, and the overlapping description is omitted.

The resin composition of the present invention comprises a plant-derived polymer compound and a polyimide resin.

The plant-derived polymer compound is not particularly limited so long as it is derived from a plant. However, the plant-derived polymer compound is preferably a biodegradable polymer compound from the standpoint of reduction of industrial waste. The biodegradable polymer compound is not particularly limited so long as it is a polymer having a biodegradable property, that is, a property that the polymer is degraded into carbon dioxide and water with microorganisms in soil or water. Specific examples of the biodegradable polymer compound include celluloses such as starch, chitosan, cellulose acetate and cellulose formate; and aliphatic polyesters such as a polyhydroxybutyric acid, a polybutylene succinate and a polybutylene adipate. Of those, the aliphatic polyesters are preferable from that those have excellent compatibility with the polyimide resin, and can form a resin molding having further high mechanical strength, heat resistance and flame retardancy. When the aliphatic polyesters are used, a resin molding obtained by merely blending a slight amount of a polyimide resin has sufficient heat resistance comparable to general-purpose engineering plastics, and further has excellent impact resistance. Further, the resin composition using the aliphatic polyesters can provide a resin molding having a bond utilizing polycondensation property between an imide terminal in the polyimide resin and the aliphatic polyester, and further sufficiently suppress deformation and deterioration of mechanical strength under high temperature and high humidity environment. Of those aliphatic polyesters, a polylactic acid is particularly preferable in that compatibility with the polyimide resin is further excellent, and mechanical strength, heat resistance and flame retardancy of a resin molding can further be improved. Those plant-derived polymer compounds can be used alone or as mixtures of two or more thereof.

When a polylactic acid is used as the plant-derived polymer compound, particularly high mechanical strength, heat resistance and flame retardancy can be obtained in combination with the polyimide resin. The reason for this is not always clarified, but it is presumed that compatibility between the polylactic acid and the polyimide resin is enhanced by an interaction between a carboxyl group at the terminal of the polylactic acid and a carbonyl group possessed by the polyimide resin.

In the resin composition of the present invention, when a polylactic acid is used as the plant-derived polymer compound, the polylactic acid has a weight average molecular weight of preferably from 1,000 to 200,000, and particularly preferably from 5,000 to 100,000. Where the weight average molecular weight is less than 1,000, there is the tendency that mechanical strength of a resin molding obtained deteriorates, and where it exceeds 200,000, the number of terminal groups of the polylactic acid is decreased, and there is the tendency that compatibility with the polyimide resin and an anchor effect are difficult to sufficiently develop.

In the resin composition of the present invention, the content of the plant-derived polymer compound is preferably from 5 to 99 mass %, and more preferably from 20 to 90 mass %, based on the mass of the entire resin composition. Where the content of the plant-derived polymer compound is less than 5 mass %, a biobased content of the resin composition is decreased, and there is the tendency that environmental load reduction effect is not sufficiently obtained, and where it exceeds 99 mass %, there is the tendency that mechanical properties, heat resistance and flame retardancy of a resin molding obtained deteriorate.

The polyimide resin used in the present invention can use the conventional polyimide resins without particular limitation. However, a thermoplastic polyimide resin is preferably used from the standpoint of compatibility with the plant-derived polymer compound.

Specific examples of the thermoplastic polyimide resin include polyimide resins comprising carboxylic anhydrides represented by the following formulae (II) to (IV), and the conventional diamines such as p-phenylenediamine, various cyclohexanediamines and hydrogenated bisphenol A diamines.

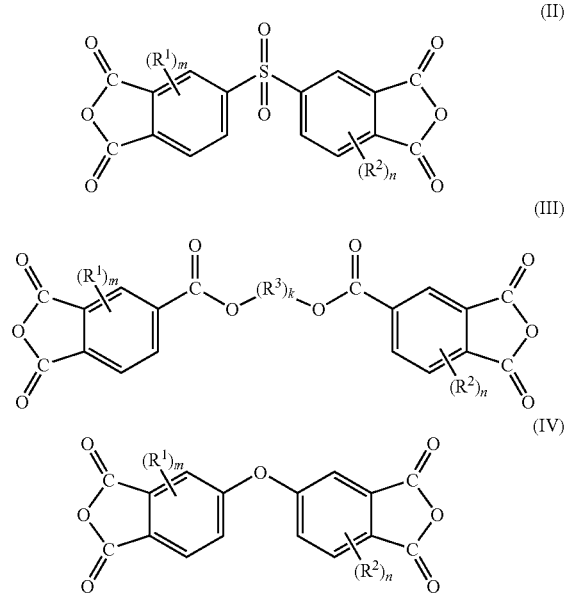

wherein $R^1$ and $R^2$ each independently represents a hydrogen atom, a linear or branched alkyl group having from 1 to 10 carbon atoms or an aryl group, $R^3$ represents an alkylene group having from 1 to 6 carbon atoms, m and n each independently are an integer of from 1 to 3, and k is an integer of from 1 to 4.

Of those thermoplastic polyimide resins, the polyimide resin represented by the following formula (I) has extremely high compatibility with the plant-derived polymer compound and the flame retardant, and is therefore preferably used. Further, in the polyimide resin represented by the following formula (I), a polyimide resin wherein diamines are changed from a hydrogenated bisphenol A diamine to various cyclohexanediamines is also preferable.

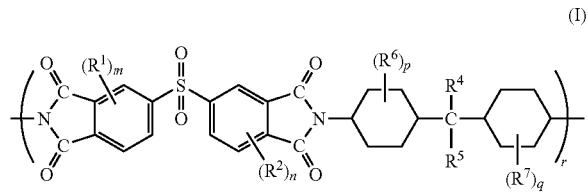

wherein $R^1$ and $R^2$ each independently represents a hydrogen atom, a linear or branched alkyl group having from 1 to 10 carbon atoms or an aryl group, $R^4$ and $R^5$ each independently represents a hydrogen atom, a linear or branched alkyl group having from 1 to 10 carbon atoms or a cycloalkyl group, $R^6$ and $R^7$ each independently represents a hydrogen atom or a linear or branched alkyl group having from 1 to 6 carbon atoms, m and n each independently are an integer of from 1 to 3, p and q each independently are an integer of from 1 to 4, and r is an integer of from 1 to 1,000.

In the formula (I), $R^1$ and $R^2$ are preferably a hydrogen atom, $R^4$ and $R^5$ each independently are preferably a methyl group or a cyclohexyl group, and $R^5$ and $R^6$ each independently are preferably a hydrogen atom or a methyl group.

The polyimide resin has a weight average molecular weight of preferably from 5,000 to 200,000, and more preferably from 10,000 to 100,000. Where the weight average molecular weight is less than 5,000, there is the tendency that mechanical strength and heat resistance deteriorate, and where it exceeds 200,000, compatibility with the plant-derived polymer compound is decreased, and there is the tendency that mechanical strength deteriorates.

Those polyimide resins can be used alone or as mixtures of two or more thereof.

In the resin composition of the present invention, the content of the polyimide resin is preferably from 1 to 95 mass %, and more preferably from 5 to 50 mass %, based on the mass of the entire resin composition. Where the content of the polyimide resin is less than 1 mass %, there is the tendency that mechanical properties, heat resistance and flame retardancy of a resin molding obtained deteriorate, and where it exceeds 95 mass %, a biobased content of the resin composition is decreased, and there is the tendency that environmental load reduction effect is not sufficiently obtained.

Where the resin composition of the present invention is used as a molding material, particularly a molding material for home electrical appliances and business equipments, extremely high flame retardancy is required for those resin moldings from the position of product liability of manufacturers. Although the level of flame retardancy required varies depending on products, flame retardancy corresponding to V-2 or more in UL94 standard is largely required. On the other hand, almost all of plant-derived polymer compounds have merely flame retardancy of less than V-2 in UL94. The same is applied to a polyimide resin. Therefore, it is preferable to add any flame retardant in order to impart flame retardancy to a resin composition comprising a plant-derived polymer compound and a polyimide resin.

A bromine flame retardant is generally said to have the highest effect as a flame retardant. However, the bromine flame retardant has the possibility to generate toxic gas when it is fired, and is therefore not preferable in the point of environmental load. On the other hand, phosphor, silicone and inorganic particle flame retardants have small environmental load, and are preferable. However, those conventionally had the problems such that from the reason that those have poor compatibility with polymer materials, bleeding occurs, mechanical strength deteriorates, and in particular, the phosphor flame retardant has high hydrolyzability. Due to those problems, it has conventionally been extremely difficult to achieve both of flame retardancy and mechanical strength in a resin molding using the resin composition containing a plant-derived polymer compound.

However, a mixture of a plant-derived polymer compound and a polyimide resin has extremely excellent compatibility with phosphor, silicone and inorganic particle flame retardants. This makes it possible to easily realize flame retardancy corresponding to V-2 or more in UL94 while suppressing the addition amount even in an inorganic particle flame retardant which is generally considered that flame retardant effect is not developed unless it is added in a large amount.

The flame retardant used in the present invention is at least one flame retardant selected from the group consisting of a phosphor flame retardant, a silicone flame retardant and an inorganic particle flame retardant. Suitable specific examples of those flame retardants include phosphor flame retardants such as a phosphoric acid ester type, a condensed phosphoric acid ester type and phosphor polymerized polyester type; silicone flame retardants such as a silicone powder and a silicone resin; and inorganic particle flame retardants such as aluminum hydroxide and magnesium hydroxide. Those flame retardants can be used alone or as mixtures of two or more thereof.

Of those flame retardants, the inorganic particle flame retardant is most excellent in the point of environmental load. The conventional resin compositions have poor compatibility between a resin component and an inorganic particle flame retardant, and cannot ensure sufficient flame retardancy unless a large amount of the inorganic particle flame retardant is blended. As a result, to ensure flame retardancy, remarkable deterioration of mechanical strength was not avoided. Contrary to this, the resin composition of the present invention has extremely high polarity and further has a rigid structure, and therefore contains a polyimide resin having its polar groups uniformly dispersed in the resin composition. Due to this, compatibility between the plant-derived polymer compound and polyimide resin, and the inorganic particle flame retardant is extremely high, and flame retardancy can sufficiently be ensured by blending a small amount of the inorganic particle flame retardant. Additionally, compatibility between the plant-derived polymer compound and the polyimide compound can be made good, and mechanical strength and heat resistance of a resin molding obtained can be improved. Further, of the inorganic particle flame retardants, magnesium hydroxide is preferable in that further high compatibility is obtained.

In the resin composition of the present invention, the content of the flame retardant is preferably from 1 to 30 mass %, and more preferably from 3 to 15 mass %, based on the mass of the entire resin composition. Where the content of the flame retardant is less than 1 mass %, there is the tendency that improvement effect of flame retardancy is insufficient, and where it exceeds 30 mass %, there is the tendency that mechanical strength and heat resistance deteriorate.

The resin composition of the present invention may further contain other additives in addition to the above-described respective components. Examples of the other additives include compatibilizers, reinforcing agents, antioxidants and weather-resistant agents. The content of those additives is not particularly limited so long as it is in a range that does not impair the effect of the present invention. However, the content of those additives is preferably 10 mass % or less based on the mass of the entire resin composition, respectively.

The resin composition of the present invention described above can increase the content of a plant-derived polymer compound, and therefore can form a resin molding having extremely low environmental load, sufficiently high mechanical strength, sufficiently high heat resistance and flame retardancy of UL-V level. Thus, the resin composition is a material extremely excellent as a molding material.

The resin molding of the present invention is described below. The resin molding of the present invention comprises the above-described plant-derived polymer compound and the above-described polyimide resin, and may further comprise the above-described flame retardant, additives and the like if necessary similar to the resin composition of the present invention. Such a resin molding is obtained by, for example, molding the resin composition of the present invention. For example, the resin molding can be obtained by molding the resin composition of the present invention with the conventional method such as injection molding, injection compression molding, press molding, extrusion molding, blow molding, calender molding, coating molding, cast molding, dipping molding and the like.

Applications of the resin molding of the present invention are not particularly limited, and specific examples of the application include packages of home electrical appliances and business equipments, or their various parts, wrapping films, cubby boxes for CD-ROM and DVD, tableware, trays for foods, bottles for drinks and wrapping materials for medicines.

The resin molding of the present invention is formed using the resin composition of the present invention. Therefore, it is possible to sufficiently increase a plant-derived content (a biobased content) and further possible to sufficiently decrease environmental load. Conventionally, a resin molding having increased biobased content has poor mechanical strength and heat resistance, and therefore cannot be used in home electrical appliances and business equipment parts. Thus, its application has been very limited. Contrary to this, the resin molding of the present invention can obtain sufficient mechanical strength and sufficient heat resistance even where a biobased content is sufficiently increased (for example, where the content of the plant-derived polymer compound in the resin composition is 30 mass % or higher), and further can obtain sufficient durability under high temperature and high humidity environment. The resin molding of the present invention having such excellent properties has been completed based on the finding that a polyimide resin having extremely high mechanical strength shows extremely high compatibility with a plant-derived polymer compound, and then based on keen investigations by the present inventors. The resin molding of the present invention has high mechanical strength and heat resistance, and further can easily obtain flame retardancy of UL-V level by adding a specific flame retardant. Therefore, the resin molding can particularly suitably used in, for example, packages and various parts of home electrical appliances and business equipments.

FIG. 1 is an appearance perspective view of an image forming apparatus provided with packages and business equipment parts, according to one embodiment of the resin molding of the invention, viewed from the front side thereof. The image forming apparatus 100 of FIG. 1 is provided with front covers 120a and 120b in front of a main body 110. Those front covers 120a and 120b are openable and closable such that a user can access in the apparatus. By this, the user can replenish a toner when the toner is consumed, can exchange a consumed process cartridge, and can remove clogged papers when jamming occurs in the apparatus. FIG. 1 shows the apparatus in the state that the front covers 120a and 120b are opened.

An operation panel 130 by which various conditions relating to image formation, such as a paper size and the number of copies, are input by the user, and a copy glass 132 on which an original copy to be read off is placed are provided on the upper surface of the main body 110. Further, the main body 110 is provided with, on the upper portion thereof, an automatic original copy carrier device that can automatically carry the original copy on the copy glass 134. Further, the main body 110 is provided with an image scanning device that obtains image data showing an image on the original copy by scanning the image on the original copy placed on the copy glass 132. The image data obtained by the image scanning device are sent to an image forming unit through a control part. The image scanning device and the control part are housed in the package 150 constituting a part of the main body 110. The image forming unit is provided in the package 150 as a detachable and attachable process cartridge 142. The process cartridge 142 can be detached and attached by turning an operation lever 144.

The package 150 of the main body 110 is provided with a toner storage part 146, and a toner can be replenished from a toner supply port 148. The toner stored in the toner storage part 146 is supplied to a development device.

On the other hand, the main body 110 is provided with paper storage cassette 140a, 140b and 140c on the bottom part thereof. Further, plural delivery rollers constituted of a pair of rollers are arranged in the main body 110, so that a delivery passage is formed such that papers in the paper storage cassette is delivered to the image forming unit located at the upper part. Paper in each paper storage cassette is taken out every one paper by a paper takeoff mechanism arranged in the vicinity of the edge of the delivery passage, and is sent to the delivery passage. A manual paper tray 136 is provided at the side of the main body 110, and the paper can be supplied from this.

The paper having an image formed thereon by the image forming unit is successively transferred between two fixing rolls mutually contacted, supported by the package 152 constituting a part of the main body 110, and then discharged to the outside of the main body 110. The main body 110 is provided with a plurality of discharge trays 138 at the side opposite the side at which the paper tray 136 is provided, and papers after image formation are discharged to those trays.

In the image forming apparatus 100, the front covers 120a and 120b receive much load such as stress and shock when opening and closing, vibration when image forming, and heat generated in the image forming apparatus. The process cartridge 142 receives much load such as shock when removing, vibration when image forming, and heat generated in the image forming apparatus. The package 150 and the package 152 receive much load such as vibration when image forming, and heat generated in the image forming apparatus. For this reason, the resin molding of the present invention is suitably used as the front covers 120a and 120b, the exterior of the process cartridge 142, the package 150 and the package 152 of the image forming apparatus 100.

The production method of the resin molding of the present invention can use the conventional molding methods as described before. A method of kneading the plant-derived polymer compound and the polyimide resin, and directly injection molding the resulting mixture is preferably used. Thus, a molding method of continuously conducting kneading materials and forming a resin molding is a molding method that maximally utilizes extremely high compatibility of the respective materials constituting the resin composition of the present invention. The conventional molding method has used a two-stage method such that the respective materials are kneaded and once pelletized, and the resulting pellets are introduced into an injection molding machine to conduct molding. Contrary to this, the production method of the resin molding of the present invention can conduct kneading the respective materials and molding the kneaded material at once, that are generally required to conduct those with two stages. This makes it possible to extremely decrease electric power consumption, to decrease environmental load and further to extremely increase production efficiency.

Further, from the standpoint of obtaining a resin molding having particularly excellent flame retardancy, the production method of the resin molding of the present invention is preferably a method of kneading the plant-derived polymer compound, the polyimide resin and at least one flame retardant selected from the group consisting of a phosphor flame retardant, a silicone flame retardant and an inorganic particle flame retardant, and directly injection molding the resulting mixture.

The production conditions in the production method of the resin molding of the present invention are that a cylinder temperature is preferably from 180 to 280° C., a mold temperature is preferably from 20 to 140° C., and a cooling time is preferably from 10 to 120 seconds, although varying depending on the composition of a material.

EXAMPLE

The present invention is described in more detail below by referring to the following Examples and Comparative Examples, but it should be understood that the invention is not construed as being limited thereto.

Example 1

60 parts by mass of a polylactic acid resin (trade name "Lacea H-100", weight average molecular weight: 90,000, a product of Mitsui Chemicals, Inc.), 10 parts by mass of a polyimide resin (weight average molecular weight: 35,000) comprising a repeating unit of the structure represented by a compound (1-1) shown in Table 1 below, and 30 parts by mass of magnesium hydroxide (trade name "10A", a product of Konoshima Chemical Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 220° C. and a mold temperature of 100° C. to obtain an ISO versatile dumbbell test piece (thickness: 40 mm, width: 10 mm), JIS K7191-1HDT test piece and UL test piece (thickness: 2.0 mm).

Using the ISO versatile dumbbell test piece, tensile strength, elongation at break and flexural modulus are measured with Instron tensile tester (trade name "Strograph E10D", a product of Toyo Seiki Co., Ltd.), and Charpy impact strength is measured with a digital impact tester (trade name "DG-C", a product of Toyo Seiki Co., Ltd.). Further, using the JIS K7191-1HDT test piece, heat deformation temperature (0.45 MPa) is measured with HDT tester (E model, a product of Toyo Seiki Co., Ltd.). Further, UL94-V combustion test is conducted using the UL test piece by a vertical combustion test according to JIS Z2391. The result of combustion test is that when passed, it is indicated V-0, V-1 and V-2 in the order of high level. Test pieces that did not reach the above level are indicated "Failure". The results obtained are shown in Table 2 below.

Example 2

35 parts by mass of a polylactic acid resin (trade name "Lacea H-100", weight average molecular weight: 90,000, a product of Mitsui Chemicals, Inc.), 35 parts by mass of a polyimide resin (weight average molecular weight: 40,000) comprising a repeating unit of the structure represented by a compound (1-1) shown in Table 1 below, and 30 parts by mass of magnesium hydroxide (trade name "MGZ5", a product of Sakai Chemical Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 240° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

Example 3

80 parts by mass of a polylactic acid resin (trade name "Lacea H-100", weight average molecular weight: 90,000, a product of Mitsui Chemicals, Inc.), 10 parts by mass of a polyimide resin (weight average molecular weight: 28,000) comprising a repeating unit of the structure represented by a compound (1-1) shown in Table 1 below, and 10 parts by mass of magnesium hydroxide (trade name "MGZ5", a product of Sakai Chemical Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 210° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

Example 4

40 parts by mass of a polylactic acid resin (trade name "Lacea H-100", weight average molecular weight: 90,000, a product of Mitsui Chemicals, Inc.), 10 parts by mass of a polyimide resin (weight average molecular weight: 29,000) comprising a repeating unit of the structure represented by a compound (1-1) shown in Table 1 below, and 50 parts by mass of magnesium hydroxide (trade name "MGZ5", a product of Sakai Chemical Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 220° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

Example 5

An ISO versatile dumbbell test piece (thickness: 40 mm, width: 10 mm), JIS K7191-1HDT test piece and UL test piece (thickness: 2.0 mm) are obtained in the same manner as in Example 1, except that 10 parts by mass of a polyimide resin (weight average molecular weight: 56,000) comprising a repeating unit of the structure represented by a compound (1-2) shown in Table 1 below are used in place of 10 parts by mass of the polyimide resin comprising a repeating unit of the structure represented by a compound (1-1) shown in Table 1 below. Using those test pieces, the evaluation as in Example 1 is conducted. The results obtained are shown in Table 2 below.

Example 6

An ISO versatile dumbbell test piece (thickness: 40 mm, width: 10 mm), JIS K7191-1HDT test piece and UL test piece (thickness: 2.0 mm) are obtained in the same manner as in Example 1, except that 10 parts by mass of a polyimide resin (weight average molecular weight: 12,000) comprising a repeating unit of the structure represented by a compound (1-3) shown in Table 1 below are used in place of 10 parts by mass of the polyimide resin comprising a repeating unit of the structure represented by a compound (1-1) shown in Table 1 below. Using those test pieces, the evaluation as in Example 1 is conducted. The results obtained are shown in Table 2 below.

Example 7

An ISO versatile dumbbell test piece (thickness: 40 mm, width: 10 mm), JIS K7191-1HDT test piece and UL test piece (thickness: 2.0 mm) are obtained in the same manner as in Example 1, except that 10 parts by mass of a polyimide resin (weight average molecular weight: 88,000) comprising a repeating unit of the structure represented by a compound (1-4) shown in Table 1 below are used in place of 10 parts by mass of the polyimide resin comprising a repeating unit of the structure represented by a compound (1-1) shown in Table 1 below. Using those test pieces, the evaluation as in Example 1 is conducted. The results obtained are shown in Table 2 below.

Example 8

70 parts by mass of a polylactic acid resin (trade name "Lacea H-100", weight average molecular weight: 90,000, a product of Mitsui Chemicals, Inc.), 10 parts by mass of a polyimide resin (weight average molecular weight: 63,000) comprising a repeating unit of the structure represented by a compound (1-1) shown in Table 1 below, and 20 parts by mass of a phosphoric acid ester flame retardant (trade name "CR-741", a product of Daihachi Chemical Industry Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 220° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

Example 9

70 parts by mass of a polylactic acid resin (trade name "Lacea H-100", weight average molecular weight: 90,000, a product of Mitsui Chemicals, Inc.), 10 parts by mass of a polyimide resin (weight average molecular weight: 55,000) comprising a repeating unit of the structure represented by a compound (1-1) shown in Table 1 below, and 20 parts by mass of a silicone flame retardant (trade name "Kaneka Ace XS", a product of Kaneka Corporation) are introduced into an injection molding machine (trade name "EX-500", a product of Nissei Plastic Industrial Co., Ltd.), and while kneading a resin composition comprising those materials in the injection molding machine, injection molded at a cylinder temperature of 220° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

Comparative Example 1

70 parts by mass of a polylactic acid resin (trade name "Lacea H-100", weight average molecular weight: 90,000, a product of Mitsui Chemicals, Inc.), and 30 parts by mass of magnesium hydroxide (trade name "MGZ5", a product of Sakai Chemical Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 170° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

Comparative Example 2

80 parts by mass of a polylactic acid resin (trade name "Lacea H-100", weight average molecular weight: 90,000, a product of Mitsui Chemicals, Inc.), and 20 parts by mass of a phosphor flame retardant (trade name "CR-751", a product of Daihachi Chemical Industry Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 170° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

Comparative Example 3

40 parts by mass of a polylactic acid resin (trade name "Lacea H-100", weight average molecular weight: 90,000, a product of Mitsui Chemicals, Inc.), 30 parts by mass of a polycarbonate (trade name "Panlite L-1225Y", a product of Teijin Chemicals Ltd.), and 30 parts by mass of magnesium hydroxide (trade name "MGZ5", a product of Sakai Chemical Co., Ltd.) are introduced into an injection molding machine (trade name "EX-500", a product of Nissei Plastic Industrial Co., Ltd.), and while kneading a resin composition comprising those materials in the injection molding machine, injection molded at a cylinder temperature of 230° C. and a mold temperature of 100° C. to obtain an ISO versatile dumbbell test piece (thickness: 40 mm, width: 10 mm), JIS K7191-1HDT test piece and UL test piece (thickness: 2.0 mm). Using those test pieces, the same evaluation as in Example 1 is conducted. The results obtained are shown in Table 2 below.

TABLE 1

| Compound No. | Structural formula |
|---|---|
| 1-1 | ![structure 1-1] |
| 1-2 | ![structure 1-2] |
| 1-3 | ![structure 1-3] |
| 1-4 | ![structure 1-4] |

TABLE 2

|  | Mechanical strength | | | | Heat resistance | |
| --- | --- | --- | --- | --- | --- | --- |
|  | Tensile strength (MPa) | Elongation at break (%) | Flexural modulus (MPa) | Charpy impact strength (kJ/m$^2$) | Heat deformation temperature <0.45 MPa> (° C.) | Flame retardancy UL94-V test |
| Example 1 | 68 | 36 | 4600 | 3.2 | 78 | V-0 |
| Example 2 | 66 | 30 | 5400 | 6.5 | 96 | V-0 |
| Example 3 | 70 | 38 | 4900 | 4.6 | 88 | V-0 |
| Example 4 | 71 | 40 | 4800 | 3.4 | 76 | V-0 |
| Example 5 | 66 | 36 | 4400 | 3.0 | 79 | V-0 |
| Example 6 | 64 | 36 | 4500 | 3.2 | 78 | V-0 |
| Example 7 | 60 | 38 | 4200 | 3.0 | 77 | V-0 |
| Example 8 | 68 | 48 | 4600 | 3.2 | 76 | V-0 |
| Example 9 | 70 | 44 | 4700 | 3.4 | 82 | V-0 |
| Comparative Example 1 | 42 | 2 | 3600 | 0.5 | 54 | Failure |
| Comparative Example 2 | 40 | 4 | 3400 | 0.7 | 56 | V-2 |
| Comparative Example 3 | 36 | 28 | 2400 | 1.4 | 68 | Failure |

As is apparent from the results shown in Table 2 above, it is confirmed that the resin composition and resin molding of the present invention (Examples 1 to 9) comprise a plant-derived polymer compound as a main component, thereby greatly reducing environmental load, and have sufficiently high mechanical strength, excellent heat resistance and sufficient flame retardancy as compared with the resin composition and resin molding of Comparative Examples 1 to 3. (Examples 10 to 18 and Comparative Examples 4 to 6)

Front covers for a color multifunction machine (Docucentre Color 500, a product of Fuji Xerox Co., Ltd.) of Examples 10 to 18 and Comparative Examples 4 to 6 are prepared by injection molding the resin compositions used in Examples 1 to 9 and Comparative Examples 1 to 3 under the same conditions thereof, respectively. A rigid sphere drop test (a rigid sphere having a diameter of 50 mm and a weight of 50 g is dropped from a distance of 100 cm upper a resin molding, this test is repeated 10 times, and evaluation is made on the number of breakage) is conducted on each of the front covers. Further, durability test (time test) at a temperature of 60° C. and a humidity of 85% for 500 hours is conducted on each of the front covers obtained, and deformation is visually observed. The results obtained are shown in Table 3 below.

TABLE 3

|  | Rigid sphere drop test (Number of breakage/10 times) | Durability test (Deformation) |
| --- | --- | --- |
| Example 10 | 0 | No deformation |
| Example 11 | 0 | No deformation |
| Example 12 | 0 | No deformation |
| Example 13 | 0 | No deformation |
| Example 14 | 0 | No deformation |
| Example 15 | 0 | No deformation |
| Example 16 | 0 | No deformation |
| Example 17 | 0 | No deformation |
| Example 18 | 0 | No deformation |
| Comparative Example 4 | 10 | Apparent warpage is generated |
| Comparative Example 5 | 9 | Apparent warpage is generated |
| Comparative Example 6 | 7 | Apparent warpage is generated |

As is apparent from the results shown in Table 3, it is confirmed that business equipment parts (Examples 10 to 18) as the resin moldings comprising the resin composition of the present invention have sufficient mechanical strength durable to a rigid sphere drop test and have excellent durability under high temperature and high humidity environment as compared with the business equipment parts of Comparative Examples 4 to 6.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A resin composition, which comprises:
    a plant-derived polymer compound that is from 20 to 60 mass %; and
    a polyimide resin compound that is from 5 to 50 mass %.

2. The resin composition according to claim 1,
    wherein the plant-derived polymer compound is a biodegradable polymer compound.

3. The resin composition according to claim 2,
    wherein the biodegradable plant-derived polymer compound is a polylactic acid.

4. The resin composition according to claim 1,
    wherein the polyimide resin is a thermoplastic polyimide resin.

5. The resin composition according to claim 1,
    wherein the polyimide resin is a polyimide resin represented by formula (I):

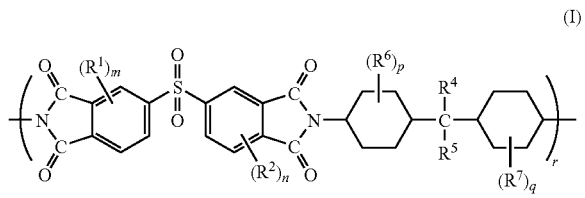
(I)

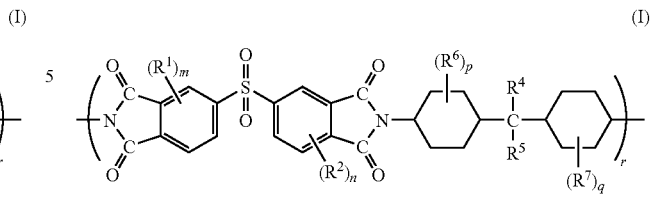
(I)

wherein R¹ and R² each independently represents a hydrogen atom, a linear or branched alkyl group having from 1 to 10 carbon atoms or an aryl group;

R⁴ and R⁵ each independently represents a hydrogen atom, a linear or branched alkyl group having from 1 to 10 carbon atoms or a cycloalkyl group;

R⁶ and R⁷ each independently represents a hydrogen atom or a linear or branched alkyl group having from 1 to 6 carbon atoms;

m and n each independently represents an integer of from 1 to 3;

p and q each independently represents an integer of from 1 to 4; and r represents an integer of from 1 to 1,000.

6. The resin composition according to claim 1, which further comprises at least one flame retardant selected from the group consisting of a phosphor flame retardant, a silicone flame retardant and an inorganic particle flame retardant.

7. The resin composition according to claim 6, which comprises magnesium hydroxide as one of the at least one flame retardant.

8. A resin molding, which comprises:
a plant-derived polymer compound that is from 20 to 60 mass %; and
a polyimide resin compound that is from 5 to 50 mass %.

9. The resin molding according to claim 8,
wherein the plant-derived polymer compound is a biodegradable polymer compound.

10. The resin molding according to claim 9,
wherein the biodegradable polymer compound is a polylactic acid.

11. The resin molding according to claim 8,
wherein the polyimide resin is a thermoplastic polyimide resin.

12. The resin molding according to claim 8,
wherein the polyimide resin is a polyimide resin represented by formula (I):

wherein R¹ and R² each independently represents a hydrogen atom, a linear or branched alkyl group having from 1 to 10 carbon atoms or an aryl group;

R⁴ and R⁵ each independently represents a hydrogen atom, a linear or branched alkyl group having from 1 to 10 carbon atoms or a cycloalkyl group;

R⁶ and R⁷ each independently represents a hydrogen atom or a linear or branched alkyl group having from 1 to 6 carbon atoms;

m and n each independently represents an integer of from 1 to 3;

p and q each independently represents an integer of from 1 to 4; and r represents an integer of from 1 to 1,000.

13. The resin molding according to claim 8, which further comprises at least one flame retardant selected from the group consisting of a phosphor flame retardant, a silicone flame retardant and an inorganic particle flame retardant.

14. The resin composition according to claim 13, which comprises magnesium hydroxide as one of the at least one flame retardant.

15. A resin molding, which partially or wholly comprises a resin molding obtained by molding a resin composition according to claim 1.

16. A production method of a resin molding, the method comprising:
kneading a plant-derived polymer compound and a polyimide resin, so as to form a mixture; and then
injection molding the mixture, wherein
the plant-derived polymer compound is from 20 to 60 mass %, and the polyimide resin is from 5 to 50 mass %.

17. The production method of a resin molding according to claim 16, the method comprising:
kneading a plant-derived polymer compound, a polyimide resin and at least one flame retardant selected from the group consisting of a phosphor flame retardant, a silicone flame retardant and an inorganic particle flame retardant, so as to form a mixture; and then
injection molding the mixture.

* * * * *